(12) United States Patent
Zweig et al.

(10) Patent No.: US 12,284,256 B2
(45) Date of Patent: Apr. 22, 2025

(54) SYSTEM AND METHOD THEREOF FOR DETERMINING AVAILABILITY OF A USER FOR INTERACTION WITH A DIGITAL ASSISTANT

(71) Applicant: Intuition Robotics, Ltd., Ramat-Gan (IL)

(72) Inventors: Shay Zweig, Harel (IL); Yuval Baumel, Tel Aviv (IL); Dor Skuler, Oranit (IL); Guy Ziv, Tel Aviv (IL); Chen Sorias, Kibbutz Zikim (IL); Anna Mowszowski, Netanya (IL)

(73) Assignee: Intuition Robotics, Ltd., Ramat-Gan (IL)

( * ) Notice: Subject to any disclaimer, the term of this patent is extended or adjusted under 35 U.S.C. 154(b) by 0 days.

(21) Appl. No.: 18/172,717

(22) Filed: Feb. 22, 2023

(65) Prior Publication Data
US 2023/0269303 A1    Aug. 24, 2023

Related U.S. Application Data

(60) Provisional application No. 63/268,333, filed on Feb. 22, 2022.

(51) Int. Cl.
*H04L 67/54* (2022.01)
*G06Q 10/10* (2023.01)
*H04L 67/50* (2022.01)

(52) U.S. Cl.
CPC ............. *H04L 67/54* (2022.05); *G06Q 10/10* (2013.01); *H04L 67/535* (2022.05)

(58) Field of Classification Search
CPC ........ H04L 67/54; H04L 67/535; G06Q 10/10
See application file for complete search history.

(56) References Cited

U.S. PATENT DOCUMENTS

| | | | |
|---|---|---|---|
| 10,192,552 B2* | 1/2019 | Raitio | G10L 25/18 |
| 10,764,232 B1* | 9/2020 | Yanes | H04L 67/535 |
| 10,909,507 B1* | 2/2021 | VanBlon | G06Q 10/1095 |
| 11,140,102 B1* | 10/2021 | Bax | H04L 67/535 |
| 2016/0065630 A1* | 3/2016 | Gupta | G06Q 50/01 |
| | | | 709/204 |
| 2016/0253628 A1* | 9/2016 | Uretzky | H04L 67/54 |
| | | | 705/7.18 |
| 2016/0321551 A1* | 11/2016 | Priness | G06N 5/047 |
| 2017/0132199 A1* | 5/2017 | Vescovi | G06F 3/04842 |
| 2017/0289766 A1* | 10/2017 | Scott | H04W 8/005 |
| 2017/0374176 A1* | 12/2017 | Agrawal | G06Q 30/0269 |

(Continued)

*Primary Examiner* — Blake J Rubin
(74) *Attorney, Agent, or Firm* — M&B IP Analysts, LLC (57) ABSTRACT

A method for determining availability of a user for interaction with a digital assistant comprises: determining if the user is present in a predetermined proximity to an input/output (I/O) device; collecting, at least real-time data about the user and historical user-agent interaction data for the user when the user is present; determining, a current user availability score based on at least the collected real-time data and the historical user-agent interaction data to derive an optimal time for interaction initiation by the digital assistant; and executing a plan selected from amongst a plurality of plans, the selected plan having a user availability score best matching the current user availability score, wherein each of the plurality of plans is designed to be executed by the digital assistant via the I/O device.

19 Claims, 4 Drawing Sheets

(56) References Cited

U.S. PATENT DOCUMENTS

| | | | |
|---|---|---|---|
| 2018/0006967 A1* | 1/2018 | Dotan-Cohen | H04L 67/306 |
| 2018/0007099 A1* | 1/2018 | Ein-Gil | H04L 65/403 |
| 2018/0113586 A1* | 4/2018 | Arar | H04L 67/306 |
| 2018/0262539 A1* | 9/2018 | Feast | H04L 67/54 |
| 2018/0350144 A1* | 12/2018 | Rathod | G06Q 20/3224 |
| 2019/0180742 A1* | 6/2019 | Kothari | G06F 3/167 |
| 2019/0205839 A1* | 7/2019 | Dotan-Cohen | H04L 67/535 |
| 2019/0213528 A1* | 7/2019 | Gupta | G06Q 10/10 |
| 2019/0295551 A1* | 9/2019 | White | H04L 67/306 |
| 2019/0364001 A1* | 11/2019 | Dotan-Cohen | G06Q 10/107 |
| 2019/0373101 A1* | 12/2019 | Dotan-Cohen | H04M 1/72451 |
| 2020/0310749 A1* | 10/2020 | Miller | G06F 9/4881 |
| 2020/0312317 A1* | 10/2020 | Kothari | H04L 67/125 |
| 2021/0004770 A1* | 1/2021 | Bansal | G06F 9/453 |
| 2021/0029064 A1* | 1/2021 | Higgins | G06N 20/00 |
| 2021/0105332 A1* | 4/2021 | Bellet | H04L 67/54 |
| 2021/0326344 A1* | 10/2021 | Schaller | G06F 9/453 |
| 2021/0350803 A1* | 11/2021 | Hansen | H04L 43/0811 |
| 2022/0351740 A1* | 11/2022 | Aher | G10L 25/51 |

* cited by examiner

SYSTEM AND METHOD THEREOF FOR DETERMINING AVAILABILITY OF A USER FOR INTERACTION WITH A DIGITAL ASSISTANT

CROSS-REFERENCE TO RELATED APPLICATIONS

This application claims benefit of U.S. provisional patent application Ser. No. 63/268,333, filed Feb. 22, 2022, which is herein incorporated by reference.

TECHNICAL FIELD

The disclosure generally relates to digital assistants operated in an I/O device, and more specifically for techniques for determining availability of a user for interaction with a digital assistant.

BACKGROUND

Digital assistants are designed to help users in planning their days, suggesting actions, and so on. However, a user-agent, e.g., digital assistant, interaction may be irritating and unfruitful if the interaction is ill-timed or incompatible with the availability state of the user and/or not properly managed.

Different communications that are initiated by a digital assistant do not necessarily have the same importance level. Therefore, the way the digital assistant times and communicates an interaction with a user in a first scenario does not necessarily suit a second scenario.

In addition, the availability of the user may vary with respect to different interaction topics. That is, the availability level of the user with respect to a first topic may not be identical to the availability level of the user with respect to a second topic. However, known digital assistants do not provide solutions for these problems. Therefore, the user may encounter an unpleasant user experience when interacting with the digital assistant. As such, users may be frustrated from actions performed or suggested by the digital assistants, and eventually abandon the usage of such devices.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining availability of a user for interaction with a digital assistant. The method comprises: determining, by the digital assistant, if the user is present in a predetermined proximity to an input/output (I/O) device on which is executing at least a portion of the digital assistant, wherein the user being present is determined based on information collected by at least one sensor of the input/output (I/O) device; collecting, by the digital assistant, at least real-time data about the user and historical user-agent interaction data for the user when the result of the determining is that the user is present in proximity to the digital assistant; determining, by the digital assistant, a current user availability score based on at least the collected real time data and the historical user-agent interaction data to derive an optimal time for interaction initiation by the digital assistant; and executing a plan selected from amongst a plurality of plans, the selected plan having a user availability score best matching the current user availability score, wherein each of the plurality of plans is designed to be executed by the digital assistant via the I/O device.

Certain embodiments disclosed herein include a system for determining availability of a user for interaction with a digital assistant. The system comprises a processing circuitry; and a memory, the memory containing instructions that, when executed by the processing circuitry, configure the system to: determine if the user is present in a predetermined proximity to an input/output (I/O) device on which is executing at least a portion of the digital assistant, wherein the user being present is determined based on information collected by at least one sensor of the input/output (I/O) device; collect at least real-time data about the user and historical user-agent interaction data for the user when the result of the determining is that the user is present in proximity to the digital assistant; determine a current user availability score based on at least the collected real time data and the historical user-agent interaction data to derive an optimal time for interaction initiation by the digital assistant; and execute a plan selected from amongst a plurality of plans, the selected plan having a user availability score best matching the current user availability score, wherein each of the plurality of plans is designed to be executed by the digital assistant via the I/O device.

DETAILED DESCRIPTION

The embodiments disclosed by the disclosure are only examples of the many possible advantageous uses and implementations of the innovative teachings presented herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein provide specific advantages in the solution of digital assistant utilization problems. Digital assistants are designed to help users in planning their days, suggesting actions, and so on. However, providing recommendations or suggestions is not enough as the users may not take actions due to the current state of the user or the like. The disclosed embodiments provide digital assistants with the ability to detect the user's availability with respect to multiple plans that are designed to be executed by the digital assistant by means of a I/O device, based on at least real-time data, as further discussed herein. Thus, the digital assistant can implement one or more plans that would cause the user to perform a recommended action. By selecting plans for execution for which the availability of the user may be relatively high, the efficiency of the I/O device executing the digital assistant is improved as unsuitable outputs are avoided.

Put another way, while the user may appear to be available, with respect to certain actions the user may be unresponsive due to the state of the user. Therefore, the digital assistant determines the user's effective availability with respect to multiple plans that the digital assistant may execute based on available data and then accordingly executes one or more of the plans in order to get the user to perform an action that the digital assistant would like the user to perform.

Figure 1:
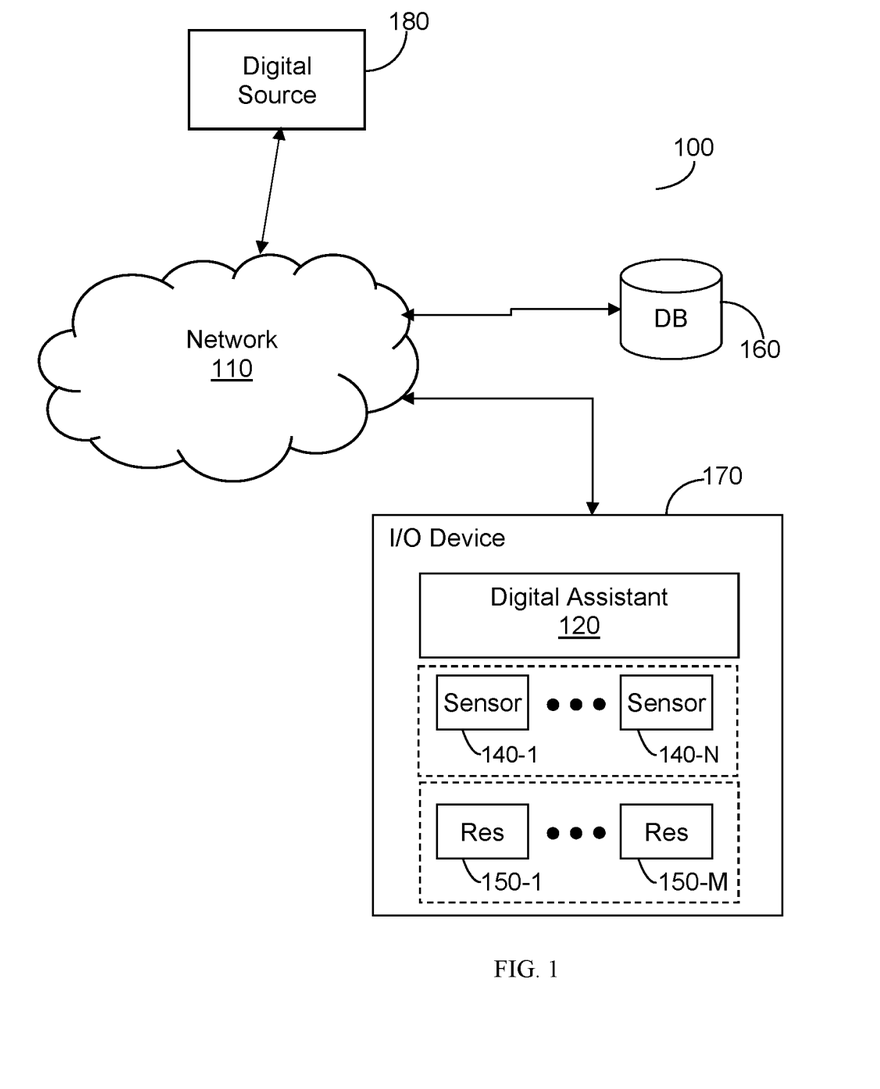
FIG. 1 is a network diagram utilized to describe the various disclosed embodiments.

FIG. 1 is an example network diagram 100 utilized to describe the various disclosed embodiments. The network diagram 100 includes an input/output (I/O) device 170 hosting, or on which is executing, a digital assistant 120. In some embodiments, the digital assistant 120 is further connected to a network 110 to allow some of the processing for digital assistant 120 to be performed by a remote server, e.g., a cloud server. The network 110 may provide for communication between the elements shown in the network diagram 100. The network 110 may be, but is not limited to, a local area network (LAN), a wide area network (WAN), a metro area network (MAN), the Internet, a wireless, cellular, or wired network, and the like, and any combination thereof.

In an embodiment, the digital assistant 120 may be connected to, or implemented by, the I/O device 170. The I/O device 170 may be, for example and without limitation, a robot, a social robot, a service robot, a smart TV, a smartphone, a wearable device, a vehicle, a computer, a smart appliance, and the like.

The digital assistant 120 may be realized in software or firmware executing on hardware, hardware, and any combination thereof. An illustrative block diagram of a controller that may execute the processes of the digital assistant 120 is provided in FIG. 2. The digital assistant 120 is configured to process sensor data collected by sensors of, or coupled to, the I/O device 170. Such sensor data may be collected by one or more sensors, 140-1 to 140-N, where N is an integer equal to or greater than 1, hereinafter referred to as "sensor" 140 or "sensors" 140 for simplicity.

The I/O device 170 typically also contains or is coupled to one or more resources 150-1 to 150-M, where M is an integer equal to or greater than 1, hereinafter referred to as "resource" 150 or "resources" 150 for simplicity. The resources 150 may include, for example, electro-mechanical elements, display units, speakers, and the like. The electro-mechanical elements may include, for example, a robotic arm, robotic legs, and computer-controllable wheels. The resources 150 are typically used to take action by the I/O device 170 and may be used to execute an action. In addition, sensor data may also be made available from one or more resources 150. To this end, in an embodiment, at least one resource 150 may include at least one sensor as well, which may be one of the sensors 140. The sensors 140 and the resources 150 are included in the I/O device 170.

The sensors 140 may include input devices, such as various sensors, detectors, microphones, touch sensors, movement detectors, cameras, and the like. In various embodiments, any of the sensors 140 may be communicatively, or otherwise connected to the digital assistant 120, the particulars of such connection not illustrated in FIG. 1 for the sake of simplicity. The sensors 140 may be configured to sense signals received from a user interacting with the I/O device 170 or the digital assistant 120, signals received from the environment surrounding the user, and the like. In an embodiment, the sensors 140 may be implemented as virtual sensors that receive inputs from online services. In some such embodiments, the sensor data may not be strictly currently sensable information but may also include information that extends into or is predicted for the future, e.g., the weather forecast, a user's calendar, and the like. Similarly, resources 150 may receive and supply sensor data or other data, including from remote sources.

In an embodiment, the network diagram 100 further includes a database (DB) 160. The database 160 may be stored within the I/O device 170, e.g., within a storage device (not shown), or may be separate from the I/O device 170 and connected thereto via the network 110. The database 160 may be utilized for storing, for example, historical data about one or more users, users' preferences and related policies, and the like, as well as any combination thereof.

In an embodiment, the network diagram 100 further includes one or more digital sources 180. A digital source is a computerized environment that includes data related to the user and that may be indicative to the user's plans, schedule, etc. The digital source 180 may include for example and without limitation, the user's electronic calendar, social media accounts, electronic mail, email, account, websites, and the like.

According to some examples, the digital assistant 120 is configured to determine the availability of the user with respect to plans designed to be executed by the I/O device 170 executing the digital assistant 120. To this end, after determining that the user is present using information collected from sensors, e.g., the sensors 140, and data collected from one or more digital sources, e.g., the digital sources 180, real-time data about the user and the environment near the user is collected. The real-time data is used for determining a current user availability score with respect to a plurality of plans designed to be executed by the digital assistant 120 using the I/O device 170. The current user availability score is a score indicating the probability that the user would react in a positive manner to a proactive attempt of the digital assistant 120 to interact with the user, and in particular, for example, to accept the plan suggested by the digital assistant. In a further embodiment, the plan of the plurality of plans that has a highest current user availability score is selected and executed by the digital assistant 120 by means of the I/O device 170.

Figure 2:
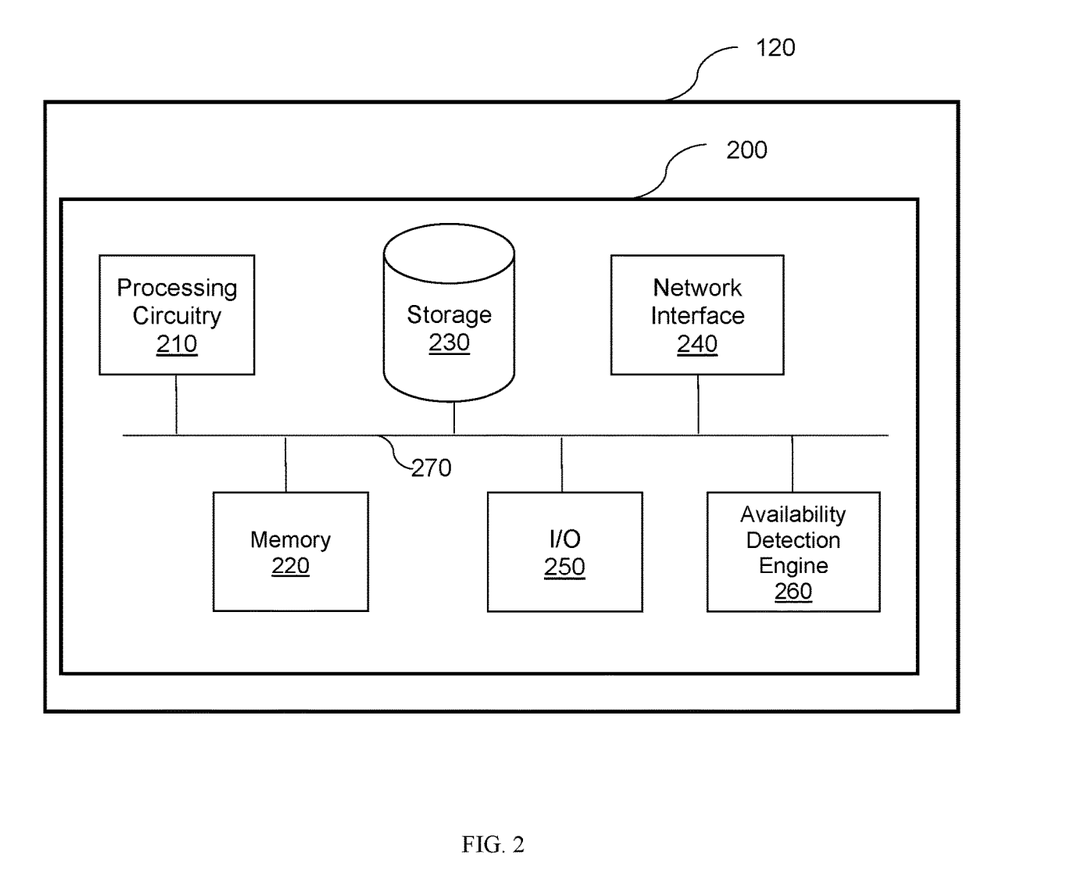
FIG. 2 is a diagram of a controller acting as a hardware layer of a digital assistant according to an embodiment.

FIG. 2 is an example block diagram of a controller 200 acting as a hardware layer of a digital assistant 120, according to an embodiment. The controller 200 includes a processing circuitry 210, a memory 220, a storage 230, a network interface 240, an input/output (I/O) interface 250, and an availability detection engine 260. According to a further embodiment, the components of the controller 200 are connected via a bus 270.

The processing circuitry 210 is configured to receive data, analyze data, generate outputs, and the like, as further described hereinbelow. The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may contain therein instructions that, when executed by the processing circuitry 210, can cause the controller 200 to execute actions as further described hereinbelow. The memory 220 may further store therein information, e.g., data associated with one or more users, historical data about one or more users, users' preferences, and the like.

The storage 230 may be magnetic storage, optical storage, and the like, and may be realized, for example, as a flash memory or other memory technology, or any other medium which can be used to store the desired information.

The network interface 240 is configured to connect to a network, e.g., the network 110 of FIG. 1. The network interface 240 may include, but is not limited to, a wired interface, e.g., an Ethernet port or a wireless port, e.g., an 802.11 compliant Wi-Fi card, configured to connect to a network (not shown).

The I/O interface 250 is configured to control the resources 150 (shown in FIG. 1) which are connected to the digital assistant 120. In an embodiment, the I/O interface 250 is configured to receive one or more signals captured by the sensors 140 (see FIG. 1) of the digital assistant 120 and to send such signals to the processing circuitry 210 for analysis. According to an embodiment, the I/O interface 250 is configured to analyze the signals captured by the sensors 140, detectors, and the like. According to an embodiment, processing circuitry 210 is configured to analyze the signals captured by the sensors 140. According to a further embodiment, the I/O interface 250 is configured to send one or more commands to one or more of the resources 150 for executing one or more plans, e.g., where each plan includes one or more actions, of the digital assistant 120, as further discussed hereinbelow. In a further embodiment, a plan may include one or more actions to be performed by the I/O device 170, for example, suggesting that the user will start her/his Yoga practice, reminding the user to take her/his medication in real-time, suggest playing jazz music, and the like.

The availability detection engine (ADE) 260 is configured to receive and analyze at least real-time data about the user and the environment in proximity to the user, in order to determine a user availability score with respect to a plurality of plans designed to be executed by the digital assistant by means of the I/O device 170. In a further embodiment, the ADE 260 may be used for determining user availability patterns and generating predictions for a predetermined period of time, as further discussed herein below.

In some configurations, the controller 200 may further include an artificial intelligence (AI) processor (not shown). The AI processor may be realized as one or more hardware logic components and circuits, including graphics processing units (GPUs), tensor processing units (TPUs), neural processing units, vision processing units (VPU), reconfigurable field-programmable gate arrays (FPGA), and the like. The AI processor is configured to perform, for example, machine learning based on sensory inputs received from the I/O interface 250, where the I/O interface 250 receives input data, such as sensory inputs, from the sensors 140.

According to the disclosed embodiments, the controller 200 is configured to determine whether the user is present in a predetermined proximity to the digital assistant. The predetermined proximity may be for example, at the same room, apartment, house, vehicle, and so on. Determining whether the user is present or not may be achieved based on information collected by one or more sensors, e.g., the sensors 140, of the I/O device 170, and data collected from one or more data sources, e.g., the data source 180. For example, although the digital assistant 120 cannot detect the user's presence using sensors, e.g., such the sensors 140, such as a camera or a microphone since the user is in a different room, the user's electronic calendar and a post the user posted on Facebook® may indicate that the user is at home.

In an embodiment, upon determination that the user is present in predetermined proximity to the digital assistant 120, the controller 200 may be configured to collect at least real-time data about the user and the user environment. The real-time data includes data about the user and the environment in proximity to the user. The real-time data may include, for example, images, video, audio signals, and the like, that are captured in real-time or near real-time with respect to the user. The real-time data may be sensed and collected using one or more sensors or virtual sensors, e.g., the sensors 140 of FIG. 1, and may indicate, for example, the user's mood, the specific location of the user, whether the user is awake or asleep, and the like. The real-time data about the user's environment may indicate for example, the current number of people near the user, the time, the current weather, and so on. In a further embodiment, the controller 200 may further extract, e.g., from memory or a database, and use historical data associated with the user. The historical data may indicate for example, the identity of the user's relatives, user's hobbies, patterns, preferences, and so on.

According to one embodiment, the controller 200 may be configured to continuously learn the coefficients of a model to be optimized to the characteristics and behavioral patterns of a specific user. Learning occurs at two complementary processes. The first form of learning takes place when the controller 200 determines the availability state of the user and afterwards feedback indicating that the determined availability state is inaccurate, is received from the user. For example, the digital assistant 120 determines that the user is available, initiates an interaction and the user declines the interaction, or vice versa, when the digital assistant 120 determines that the user is unavailable but then the user initiates an interaction with the digital assistant 120. Second form of learning occurs when the combination of features that are available for the digital assistant 120 are not sufficient to determine the availability state of the user. The digital assistant 120 may be configured to initiate an exploratory learning phase, including actions that are executed by the controller 200 and are used for exploring the availability of the user. It should be noted that significant information regarding the correlation dynamics between the current features state and the resultant availability state may be learned by initiating the exploratory learning phase.

According to an embodiment, at the exploratory learning phase, the controller 200 executes one of a set of dedicated exploration actions via the I/O device 170, e.g., initiates agent-user interactions with respect to specific topics, when the controller 200 determines that the user is present and not unavailable. It should be noted that when the user is not unavailable, it does not necessarily mean that the user is available with respect to a specific topic. According to the same embodiment, the controller 200 collects user's feedback data with respect to the actions, e.g., interactions, initiated by the controller 200 via the I/O device 170. The feedback data collected of the user may be used for generating a learning model. For example, when the user is identified as being alone at home, watching TV, the controller 200 may randomly initiate an interaction related to sports and collect the user response, i.e., feedback data, to determine the availability of the user with respect to such topic in this specific scenario. The feedback data may be collected using one or more sensors, e.g., the sensors 140, and analyzed using one or more techniques such as but not limited to, computer vision, audio signal processing, and the like.

In a further embodiment, the controller 200 optimizes two parameters to each feature that is associated with the user-agent interaction and the data collected about the user and the environment at the time of the interaction. The first parameter is a temporal decay coefficient that represents the duration in which a first feature exerts an impact on the availability state of the user. The second parameter is the weight associated with the first feature which represents the directionality and magnitude of impact that the first feature has on the availability state of the user. A feature may be for example: the time of day, number of people in the room near the user, identity of people near the user, current activity of the user, and so on. For example, the data collected about the user and the user environment indicates that it is Sunday, the time is 10 am, the user is in the living room with three other people and all of them are eating. According to the same example, each feature has a temporal decay coefficient and feature weight that will exert its impact on the availability state as a function of time. For example, the features associated with the number of people and eating breakfast may both have a negative coefficient with a temporal decay coefficient that indicates an hour-long duration of such state. Integration of all features that are relevant in the current state together with its coefficients in a linear-nonlinear combination, allows the controller 200 to predict the availability state of the user at a desired moment. The actual feedback from the user will produce an update step of all coefficients of the features that were relevant in the computation.

In a further embodiment, the controller 200 may be configured to generate a model of the user's availability patterns. The model of the user's availability pattern facilitates determination of the user availability in different circumstances based on either of the results of the exploratory learning phase, as well as feedback from the user in continuous non exploratory interactions. According to one embodiment, at the learning phase the controller 200 may be configured to optimize the temporal decay coefficients and weights. That is, the temporal decay coefficients and weights that were associated with each feature are optimized based on data that is gathered and learned through time.

The data that is collected through time may include for example, historical data about the user, historical user-agent interaction data, inferred related intents of the user, and user-agent interaction patterns and its temporal structure. The historical data of the user and may include the user's hobbies, routines, preferences, identity of friends and family, and the like. The historical user-agent, e.g., digital assistant, interaction data includes information about previous interactions between the digital assistant and the user that were executed in the past. The inferred related intents of the user are insights that can be learned about the user (and the user's preferences) based on the user's feedback. User-agent interaction pattern and its temporal structure is a collection of results of historical user-agent interactions and the respective coefficients associated with each feature.

For example, the user may be hosting a friend in the kitchen making dinner at 7 pm. According to the same example, under an assumption that the digital assistant 120 still has insufficient information regarding the correlation between such state and the following availability state, the controller 200 initiates an interaction with the user suggesting the user to go out for a walk, and the user feedback may be: "not now we are busy", i.e., rejection. Then, the controller 200 may use the user's feedback to optimize the temporal decay coefficient and weight of each feature based on the feedback. That is, at least one of the features in the example scenario caused the user to reject the interaction attempt of the digital assistant 120. The feature that caused the rejection may be the fact that the user has company, the activity of making dinner, the time of day, the suggest activity, a combination thereof, and the like. According to the same example, the controller 200 may increase or decrease the weight and decay coefficient of one or more of the features. Thus, for example, the feature of making dinner will be associated with a higher negative weight and longer decay, same as the feature of having company. Thus, for example, in future cases the digital assistant 120 will not suggest the user doing physical activity when the user has company and they are making a meal, or the digital assistant 120 will suggest doing physical activity only after sufficient time duration has passed. It should be noted that some features may have a greater influence on calculating the availability of the user with respect to certain topics while other may have lower influence.

In an embodiment, the digital assistant 120 may be configured to determine a current state of the user and the environment near the user based on the data that is captured in real-time, near real-time, and optionally historical data. To that end, the controller 200 is configured to collect and analyze the data. As noted herein, the real-time data may include, images, video, audio signals, and the like, that are captured in real-time or near real-time with respect to the user and the environment near the user. In an embodiment, the data may further include historical data about the user, information regarding user's behavioral patterns, user's routines, user's preferences, and so on. The data may include data that is related to the user's environment, such as the temperature outside the user's house or vehicle, traffic conditions, and the like. It should be noted that the data may be collected constantly or periodically.

A current state is state of a user and the state of the environment near the user in real-time, or near real-time. The current state may indicate whether, for example, the user is sleeping, reading, stressed, angry, or other actions or emotional behaviors. The current state may further indicate the current time, weather, number of people in the room, people's identity, and so on.

As noted above, the controller 200 is configured to analyze the data collected with respect to the user. The analysis may be achieved by applying at least one algorithm, such as a machine learning algorithm, to the data. The data may be fed into the algorithm, e.g., a machine learning model, thereby allowing the algorithm to determine in real-time or near real-time the current state of the user (and near the user) interacting with the I/O device 170. In an embodiment, the current state may be used for determining the user's general availability. General availability may refer to whether the user is unavailable or not. For example, the controller 200 may be configured to determine that the user is unavailable when the user is identified as asleep.

As an example, the current state may indicate that it is Sunday, the time is 10 am, the user is talking with another person in the living room, and that the user is smiling and laughing. According to the same example, using historical data the identity of the other person is determined to be the user's spouse.

In an embodiment, the controller 200 may be configured to determine a current user availability score. The current user availability score is a ranking indicating the probability that the user would react in a positive manner to a proactive attempt of the digital assistant 120 to interact with the user, e.g., accept the plan suggested by the digital assistant. The current user availability score is used for determining an optimal time, i.e., when the user is considered by the digital assistant 120 to be most available with respect to the action to be performed by the digital assistant 120, for initiating an interaction with the user, e.g., executing an action by the digital assistant 120. The current user availability score is determined by the controller 200 based on gathering all the features that the controller 200 processed in the relevant time and space proximity, together with the learned patterns of user's availability, all computed according to the optimized coefficients per feature.

According to another embodiment, the current user availability score may be used by the controller 200 for selecting an optimal plan from amongst a plurality of plans designed to be executed by the digital assistant 120 by means of the I/O device 170. Each plan of the plurality of plans relates to at least one topic. A topic may be for example, health, sports, family, social relationships, culture, and so on. Each plan of the plurality of plans may include an action such as, suggesting the user to start her/his yoga practice, reminding the user to take her/his medication, suggest playing jazz music, and so on. In an embodiment, based on the current user availability score, an availability of the user is determined for each topic, i.e., a categorical or topical availability.

The current user availability score may be for example, a score between "−1" to "1", where "1" is the highest score indicating that the user is totally available, and a score of "−1" indicates that the user is totally unavailable.

The controller 200 may use the availability detection engine (ADE) 260 for determining the current user availability score. According to one embodiment, the controller 200 may feed the ADE 260 with the data that was collected during the learning phase, and the current real-time data collected with respect to the user and the environment near the user. According to a further embodiment, the ADE 260 may be configured to perform, for example, machine learning based on collected data and sensory inputs received from the I/O interface 250, where the I/O interface 250 receives input data, such as sensory inputs, from the sensors 140.

According to another embodiment, the ADE 260 may be adapted to determine the current user availability score. For example, based on the collected real-time data and the results of the learning phase, the ADE 260 may determine that the current user availability score is relatively high, e.g., "0.8" out of "1".

In an embodiment, the controller 200 may be configured to select and execute a first plan of the plurality of plans having a highest compatibility with the current user availability score. For example, the current user availability score may indicate that health related plans should not be initiated now, that only social activities related plans suit the current state of the user, and so on. Thus, a plan that is likely to be accepted by the user without upsetting the user is selected and timely executed.

It should be noted that executing the first plan may be achieved by means of the I/O device 170. Such means may include for example and without limitation, display units, speakers, lights, and so on.

According to a further embodiment, a plan may be executed only upon determination that the current user availability score is above a predetermined threshold value.

Figure 3:
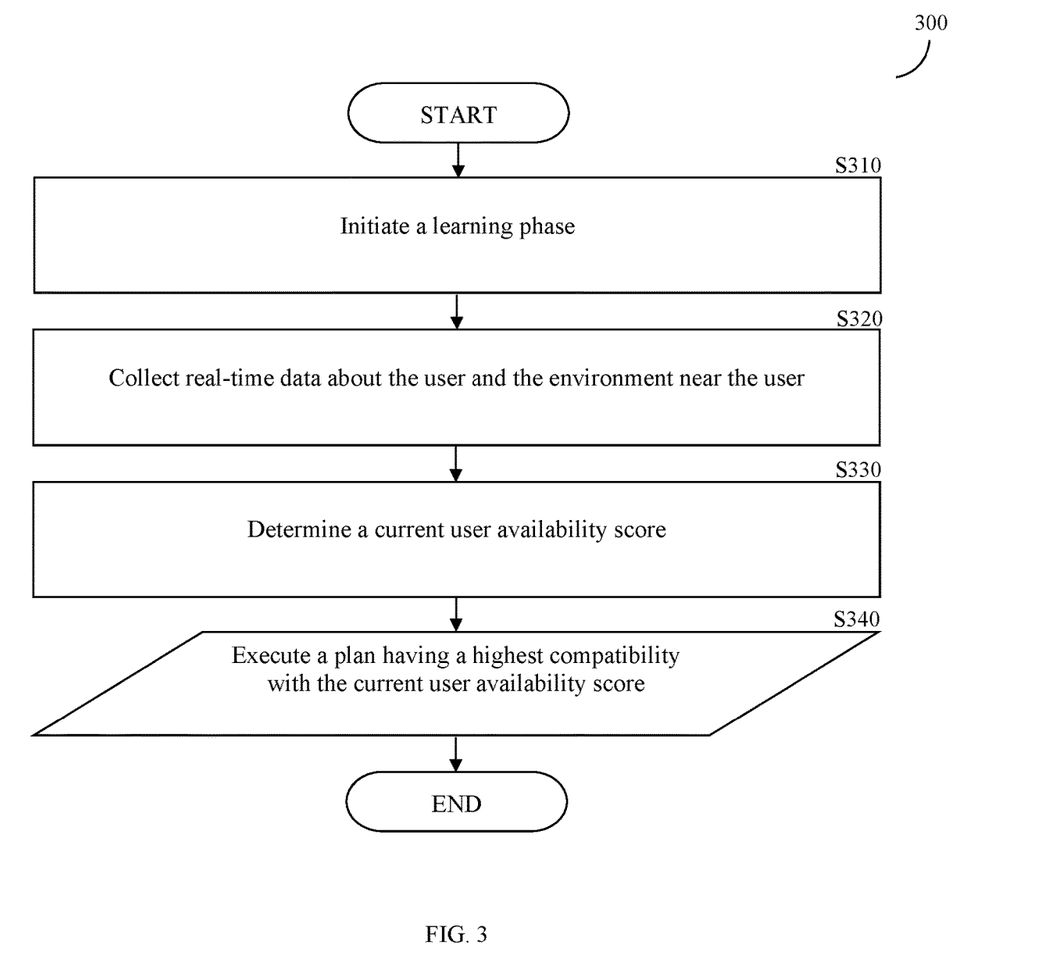
FIG. 3 is a flowchart of a method for determining availability of a user for interaction with a digital assistant according to an embodiment.

FIG. 3 shows an example flowchart 300 of a method for determining a current availability of a user for interaction with a digital assistant according to an embodiment. The method described herein may be executed by the controller 200 that is further described herein above with respect to FIG. 2. The controller 200 is integrated in an I/O device operating the digital assistant 120.

At S310, a learning phase is executed by the controller 200. The learning phase enables the controller 200 to continuously learn the coefficients of a model to be optimized to the characteristics and behavioral patterns of a specific user. The learning phase occurs at two complementary processes. The first form of learning takes place when the controller 200 determines the availability state of the user and afterwards feedback indicating that the determined availability state is inaccurate, is received from the user. For example, the digital assistant 120 determines that the user is available, initiates an interaction and the user declines the interaction, or vice versa, when the digital assistant 120 determines that the user is unavailable but then the user initiates an interaction with the digital assistant 120. The second form of learning occurs when the combination of features that are available for the digital assistant 120 are not sufficient to determine the availability state of the user. The digital assistant 120 may be configured to initiate an exploratory learning phase, including actions that are executed by the controller 200 and are used for exploring the availability of the user.

At S320, real-time data about the user and the user environment is collected. The real-time data may be collected upon determination that the user is present in predetermined proximity to the digital assistant 120. The real-time data includes data about the user and the environment in proximity to the user. The real-time data may include, for example, images, video, audio signals, and the like, that are captured in real-time or near real-time with respect to the user. The real-time data may be sensed and collected using one or more sensors or virtual sensors, e.g., the sensors 140 of FIG. 1, and may indicate, for example, the user's mood, the specific location of the user, whether the user is awake or asleep, and the like. In an embodiment, S320 may further include collecting real-time data that is indicative to the user's environment, such as the temperature outside the user's house or vehicle, traffic conditions, and the like.

At S330, a current user availability score is determined. The current user availability score allows to determine an optimal time for user-agent, e.g., digital assistant, interaction initiation. The current user availability score is determined based on the real-time data and the results of the learning phase, e.g., learned patterns. The current user availability score is a ranking indicating the probability that the user would react in a positive manner to a proactive attempt of the digital assistant 120 to interact with the user, e.g., accept the plan suggested by the digital assistant. The current user availability score may be for example, a score between "−1"

to "1", where "1" is the highest score indicating that the user is totally available, and a score of "−1" indicates that the user is totally unavailable.

At S340, a first plan of a plurality of plans having a highest compatibility with the current user availability score is executed using the digital assistant 120 by means of the I/O device 170. Each plan of the plurality of plans may include an action such as, suggesting the user to start her/his Yoga practice, reminding the user to take her/his medication, suggest playing jazz music, and so on.

Figure 4:
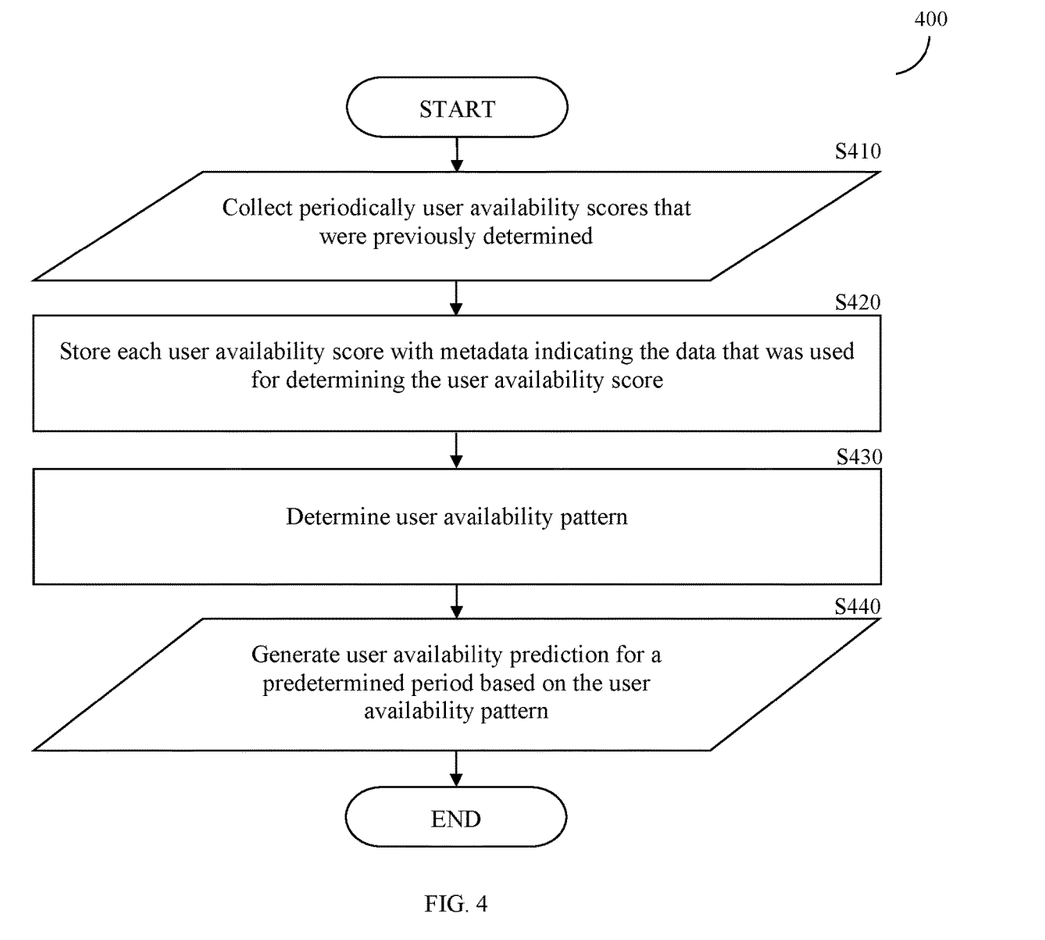
FIG. 4 is a flowchart of a method for predicting availability of a user for interaction with a digital assistant according to an embodiment.

FIG. 4 shows an example flowchart 400 of a method for predicting availability of a user for interaction with a digital assistant according to an embodiment. The method described herein may be executed by the controller 200 that is further described herein above with respect to FIG. 2. The controller 200 is integrated in an I/O device operating the digital assistant 120.

At S410, each of the current user availability scores, e.g., the current user availability score of FIG. 3, that were previously determined, e.g., at different times, are collected periodically.

At S420, each user availability score is stored in, for example, a database, e.g., the database 160, with metadata indicating the data that was used for determining the user availability score. The data may include information about the user and the user environment that was captured in real-time, historical data of the user, historical user-agent interaction data, and the like, as further described in greater detail with respect to FIG. 2.

At S430, a user availability pattern is determined. The user availability pattern characterizes the user's availability when taking into consideration multiple features. The features may include for example and without limitations, the day, the time, the temperature outside, the number of people in the room, the identity of people in the room, and so on. For example, the user availability pattern may indicate that on Mondays and Wednesdays when the user finishes her/his on-line yoga class, e.g., at 6 μm, the user availability score is relatively high, e.g., "0.8" out of "1". According to the same example, the user availability pattern may indicate that at this specific time slot, the user is usually highly available for user-agent interactions related to sports and nutrition and prefers not to talk or be reminded about medications, friends, and family.

At S440, a user availability prediction is generated for a predetermined period, based on the user availability pattern. The user availability predication is a suggested schedule, e.g., for a week, which includes one or more suggestions for executing potential plans, in specific potential time slots, that would probably be accepted by the user. The user availability prediction may be used for facilitating the generation of a more accurate user-agent (digital assistant) interaction schedule that may be generated and monitored by the digital assistant 120. For example, a weekly user-agent interaction schedule may include five reminders about the medications the user needs to take. According to the same example, the user availability prediction may be used for determining a future optimal timing during the week for initiating such interactions to remind the user to timely take her/his medications.

The various disclosed embodiments may be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit.

All examples and conditional language recited herein are intended for pedagogical purposes to aid the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A method for determining availability of a user for interaction with a digital assistant, comprising:
    determining, by the digital assistant, if the user is present in a predetermined proximity to an input/output (I/O) device on which is executing at least a portion of the digital assistant, wherein the user being present is determined based on information collected by at least one sensor of the input/output (I/O) device;
    collecting, by the digital assistant, at least real-time data about the user and historical user-agent interaction data for the user when the result of the determining is that the user is present in proximity to the digital assistant;
    determining, by the digital assistant, a current user availability score based on at least the collected real-time data and the historical user-agent interaction data to derive an optimal time for initiation by the digital assistant of an interaction between the digital assistant and the user; and
    executing a plan selected from amongst a plurality of plans, the selected plan having a highest compatibility with the current user availability score, wherein each of the plurality of plans is designed to be executed by the digital assistant via the I/O device;
    wherein at least two of the plurality of plans each relates to a different topic and wherein, for each topic, a categorical user availability score is determined.

2. The method of claim 1, wherein the digital assistant is a robot.

3. The method of claim 1, wherein the current user availability score is a score indicating a probability that the user would react in a positive manner to a proactive attempt of the digital assistant to interact with the user.

4. The method of claim 1, wherein the plan is implemented through use of at least a portion the I/O device.

5. The method of claim 1, further comprising:
collecting periodically the determined current user availability score for each of the plurality of plans.

6. The method of claim 5, further comprising:
storing each current user availability score with metadata indicating at least the respective real-time data used for determining the current user availability score of each plan of the plurality of plans.

7. The method of claim 5, further comprising:
determining a user availability pattern based on the collected determined current user availability scores.

8. The method of claim 7, further comprising:
generating a user availability prediction for a predetermined period of time for each of the plurality of plans based on the user availability pattern.

9. The method of claim 1, wherein the optimal time is the time when the user is considered by the digital assistant to be most available with respect to an action of the selected plan to be performed by the digital assistant.

10. A system for determining availability of a user for interaction with a digital assistant, comprising:
a processing circuitry; and
a memory, the memory containing instructions that, when executed by the processing circuitry, configure the system to:
determine if the user is present in a predetermined proximity to an input/output (I/O) device on which is executing at least a portion of the digital assistant, wherein the user being present is determined based on information collected by at least one sensor of the input/output (I/O) device;
collect at least real-time data about the user and historical user-agent interaction data for the user when the result of the determining is that the user is present in proximity to the digital assistant;
determine a current user availability score based on at least the collected real-time data and the historical user-agent interaction data to derive an optimal time for initiation by the digital assistant of an interaction between the digital assistant and the user; and
execute a plan selected from amongst a plurality of plans, the selected plan having a highest compatibility with the current user availability score, wherein each of the plurality of plans is designed to be executed by the digital assistant via the I/O device;
wherein at least two of the plurality of plans each relates to a different topic and wherein, for each topic, a categorical user availability score is determined.

11. The system of claim 10, wherein the digital assistant is a robot.

12. The system of claim 10, wherein the current user availability score is a score indicating a probability that the user would react in a positive manner to a proactive attempt of the digital assistant to interact with the user.

13. The system of claim 10, wherein the plan is implemented through use of at least a portion the I/O device.

14. The system of claim 10, wherein the system is further configured to:
collect periodically the determined current user availability score for each of the plurality of plans.

15. The system of claim 14, wherein the system is further configured to:
store each current user availability score with metadata indicating at least the respective real-time data used for determining the current user availability score of each plan of the plurality of plans.

16. The system of claim 14, wherein the system is further configured to:
determine a user availability pattern based on the collected determined current user availability scores.

17. The system of claim 16, wherein the system is further configured to:
generate a user availability prediction for a predetermined period of time for each of the plurality of plans based on the user availability pattern.

18. The system of claim 10, wherein the optimal time is the time when the user is considered by the digital assistant to be most available with respect to an action of the selected plan to be performed by the digital assistant.

19. A method for determining availability of a user for interaction with a digital assistant, comprising:
determining, by the digital assistant, if the user is present in a predetermined proximity to an input/output (I/O) device on which is executing at least a portion of the digital assistant, wherein the user being present is determined based on information collected by at least one sensor of the input/output (I/O) device;
collecting, by the digital assistant, at least real-time data about the user and historical user-agent interaction data for the user when the result of the determining is that the user is present in proximity to the digital assistant;
determining, by the digital assistant, a current user availability score based on at least the collected real-time data and the historical user-agent interaction data to derive an optimal time for initiation by the digital assistant of an interaction between the digital assistant and the user;
executing a plan selected from amongst a plurality of plans, the selected plan having a highest compatibility with the current user availability score, wherein each of the plurality of plans is designed to be executed by the digital assistant via the I/O device;
collecting periodically the determined current user availability score for each of the plurality of plans; and
storing each current user availability score with metadata indicating at least the respective real-time data used for determining the current user availability score of each plan of the plurality of plans.

* * * * *